(12) United States Patent
Grayson et al.

(10) Patent No.: US 10,848,958 B2
(45) Date of Patent: Nov. 24, 2020

(54) PROFILE PRIORITIZATION IN A ROAMING CONSORTIUM ENVIRONMENT

(71) Applicant: Cisco Technology, Inc., San Jose, CA (US)

(72) Inventors: Mark Grayson, Maidenhead (GB); Bart A. Brinckman, Nevele (BE); Jerome Henry, Pittsboro, NC (US); Desmond Joseph O'Connor, London (GB); Simon Dyke, Lyndhurst (GB)

(73) Assignee: Cisco Technology, Inc., San Jose, CA (US)

( * ) Notice: Subject to any disclaimer, the term of this patent is extended or adjusted under 35 U.S.C. 154(b) by 220 days.

(21) Appl. No.: 16/160,687

(22) Filed: Oct. 15, 2018

(65) Prior Publication Data
US 2020/0120481 A1   Apr. 16, 2020

(51) Int. Cl.
*H04W 8/18* (2009.01)
*H04W 48/18* (2009.01)
*H04W 48/14* (2009.01)
*H04W 84/12* (2009.01)

(52) U.S. Cl.
CPC ............ *H04W 8/18* (2013.01); *H04W 48/14* (2013.01); *H04W 48/18* (2013.01); *H04W 84/12* (2013.01)

(58) Field of Classification Search
CPC ....... H04W 8/18; H04W 48/18; H04W 48/14; H04W 84/12
See application file for complete search history.

(56) References Cited

U.S. PATENT DOCUMENTS

| 2016/0105824 A1* | 4/2016 | Kaushik ............ H04W 36/0016 370/331 |
| 2016/0183169 A1* | 6/2016 | Horn ....................... H04L 69/08 709/225 |
| 2017/0156105 A1* | 6/2017 | Mustajarvi ............ H04W 48/14 |
| 2019/0289539 A1* | 9/2019 | Lee ....................... H04W 40/08 |

* cited by examiner

*Primary Examiner* — Walter J Divito
(74) *Attorney, Agent, or Firm* — Merchant & Gould P.C.

(57) ABSTRACT

Profile prioritization in a roaming consortium environment may be provided. First, a client device may initiate a network discovery with a network device. Next, the client device may receive in response to initiating the network discovery, a response. The response may comprise an organization identifier and a plurality of response access identifiers corresponding to the organization identifier. A one of the plurality of response access identifiers may be labeled as preferred. Then the client device may determine to access the network based on the organization identifier. The client device may then select, from a plurality of profiles, a profile for accessing the network. The selected profile may have a profile access identifier corresponding to the one of the plurality of response access identifiers labeled as preferred.

20 Claims, 5 Drawing Sheets

310

{
username=user1@school1.ac.uk
password=itsAsecret
ca_cert="/home/netsec/11ubank/lib.pem"
raoming_consortium=001bc50460
320 — nai=louby.uk
eap=TTLS
phase2="auth=MSCHAPV2"
}

305

{
username=visiting1@school2.ac.uk
password=itsAsecret
ca_cert="/home/netsec/11ubank/sch.pem"
raoming_consortium=001bc50460
315 — nai=berkshire.uk
eap=TTLS
phase2="auth=MSCHAPV2"
}

```
{
username=user1@louby.uk
password=itsAsecret
ca_cert="/home/netsec/11ubank/lib.pem"
raoming_consortium=001bc50460
eap=TTLS
phase2="auth=MSCHAPV2"
}
```

405

```
{
username=visiting1@berkshire.uk
password=itsAsecret
ca_cert="/home/netsec/11ubank/sch.pem"
raoming_consortium=001bc50460
eap=TTLS
phase2="auth=MSCHAPV2"
}
```

FIG. 4

PROFILE PRIORITIZATION IN A ROAMING CONSORTIUM ENVIRONMENT

TECHNICAL FIELD

The present disclosure relates generally to a roaming consortium.

BACKGROUND

In computer networking, a wireless access point (AP) is a networking hardware device that allows a Wi-Fi compliant client device to connect to a wired network. The AP usually connects to a router (directly or indirectly via a wired network) as a standalone device, but it can also be an integral component of the router itself. Several APs may also work in coordination, either through direct wired or wireless connections, or through a central system, commonly called a wireless local area network (WLAN) controller. An AP is differentiated from a hotspot, which is the physical location where Wi-Fi access to a WLAN is available.

Prior to wireless networks, setting up a computer network in a business, home or school often required running many cables through walls and ceilings in order to deliver network access to all of the network-enabled devices in the building. With the creation of the wireless access point, network users are able to add devices that access the network with few or no cables. An AP normally connects directly to a wired Ethernet connection and the AP then provides wireless connections using radio frequency links for other devices to utilize that wired connection. Most APs support the connection of multiple wireless devices to one wired connection. Modern APs are built to support a standard for sending and receiving data using these radio frequencies.

BRIEF DESCRIPTION OF THE FIGURES

The accompanying drawings, which are incorporated in and constitute a part of this disclosure, illustrate various embodiments of the present disclosure. In the drawings:

FIG. 3 illustrates a plurality of profiles;
FIG. 4 illustrates a plurality of profiles.

DETAILED DESCRIPTION

Overview

Figure 1:
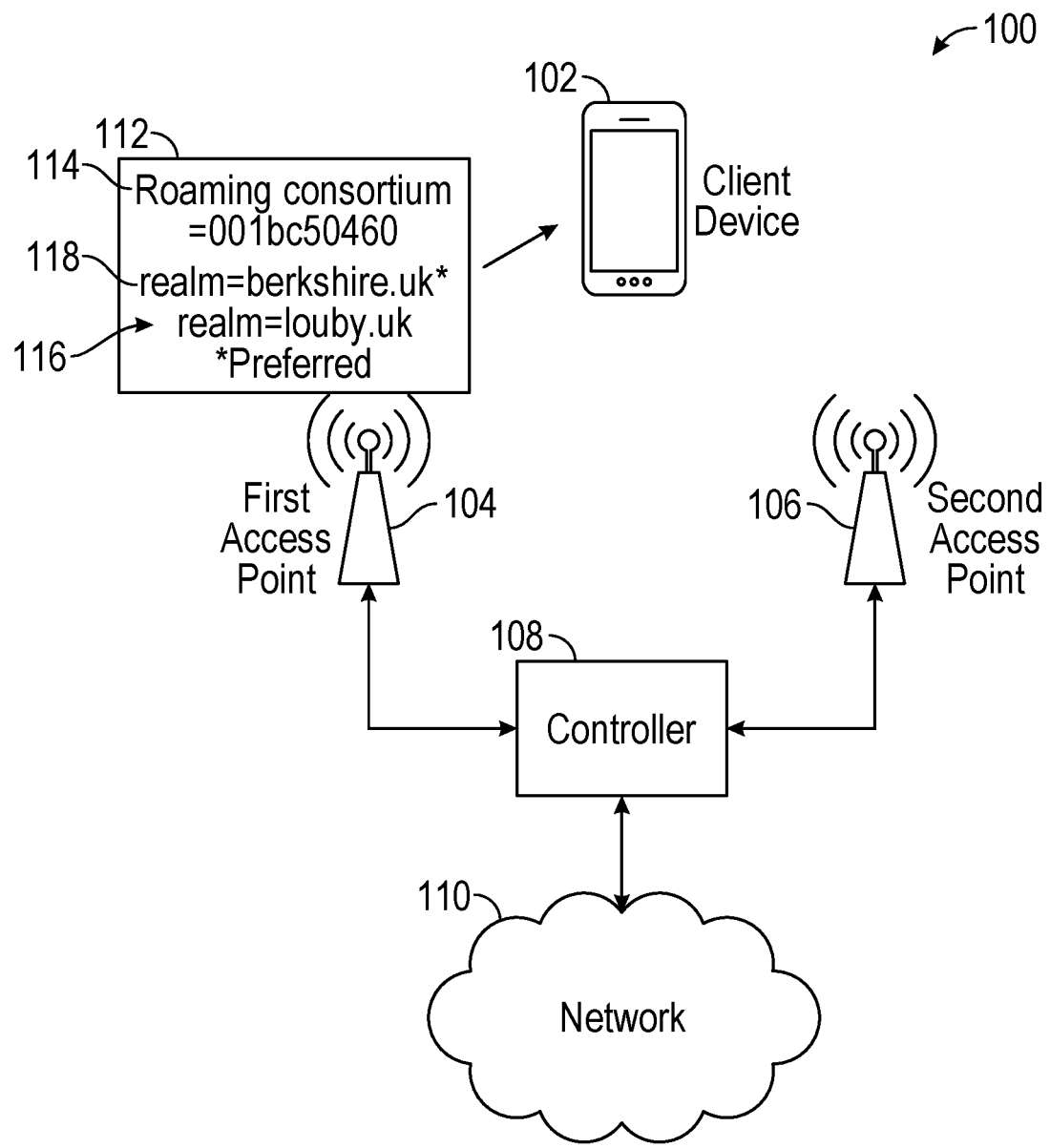
FIG. 1 is a block diagram of an operating environment.

Profile prioritization in a roaming consortium environment may be provided. First, a client device may initiate a network discovery with a network device. Next, the client device may receive in response to initiating the network discovery, a response. The response may comprise an organization identifier and a plurality of response network access identifiers corresponding to the organization identifier. A one of the plurality of response network access identifiers may be labeled as preferred. Then the client device may determine to access the network based on the organization identifier. The client device may then select, from a plurality of profiles, a profile for accessing the network. The selected profile may have a profile network access identifier corresponding to the one of the plurality of response network access identifiers labeled as preferred.

Both the foregoing overview and the following example embodiments are examples and explanatory only, and should not be considered to restrict the disclosure's scope, as described and claimed. Furthermore, features and/or variations may be provided in addition to those described. For example, embodiments of the disclosure may be directed to various feature combinations and sub-combinations described in the example embodiments.

Example Embodiments

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

An AP may be responsible for authenticating wireless client devices before permitting them to receive connectivity to the wired connection. Most APs support a plurality of authentication methods, enabling the wireless client devices to use different security credentials for authentication.

A client device may be responsible for selecting between different WLANs. The client device may be configured with a list of WLAN networks from which the client device may select a WLAN to which it may attempt to authenticate.

A client device may use data using the Access Network Query Protocol (ANQP) to select a suitable WLAN. The WLAN may use ANQP to provide information to the client device to assist in its selection procedure. This information may include lists of roaming consortiums that may be accessible via the AP, a list of subscription service providers identified by their realms that may be accessible via the AP, and/or a list cellular network that may be accessible via the AP.

Public wireless access (e.g., WLAN) may include two approaches to enable devices to select a particular network based on stored profile information: i) a Network Access Identifier (NAI) list; and ii) a Roaming Consortium Organization Identifier (RCOI). For profiles that define NAI based policies, there may be a one-to-one correspondence between the NAI used in a profile and the NAI signaled by the Wi-Fi infrastructure. Accordingly, there may be no additional requirement for prioritizing between a plurality of profiles that may be enabled in a device. With roaming consortium, a client device may have a plurality of profiles that may match an RCOI signaled from the WLAN infrastructure. For example, a roaming confederation may function with a "bring your own realm" approach where users re-use their realms when authenticating to a Wi-Fi infrastructure. Accordingly, in this scenario, NAI list based preferences may not be relied on because there may be 100's of NAIs that may be used across the confederation.

For example, a user may have a profile for the user's home enterprise. Because the user may be temporarily working at a second enterprise, the user may be provided a second profile from this second enterprise. The second enterprise may use the identity used by Wi-Fi users on the system to identify whether users are granted access to local services (e.g., for their own user/employees/teaching staff/students), versus "foreign" identities (e.g., guests/visitors) that may merely be provided with Internet access for example. There may be a beneficial opportunity for the provider of the Wi-Fi network to help in assisting the user's device in selecting an appropriate profile, for example, preferring profiles that use local credentials for visiting users.

While the above example may describe a use case using an educational enterprise roaming confederation, the same problem may occur in any other roaming confederation that connect to a plurality of identity providers and where the Wi-Fi access provider may have individual policies based on a particular identity provider. For example, these policies may comprise providing enhanced services to users that may be known a priori to be authenticated using a particular process or where the authentication uses a high entropy key, or other policies. The aforementioned use case may highlight a need for defining profile prioritization in a roaming consortium environment, for example, in global auto-onboarding solutions.

Embodiments of the disclosure may allow a client device to use an ANQP signaled NAI list and RCOI combination to support profile selection instead of just providing a single consortium ID or just a flat list of NAIs resulting in device inability to choose when several profiles match announced elements. For example, consistent with embodiments of the disclosure, a profile may be configured with an RCOI. A client device may then use this in its network selection process as a starting point. In addition, the wireless infrastructure may also signal preferred NAIs for the RCOI. This signaling can then be used by the client device in its profile selection process. For example, and as described is greater detail below, the home enterprise may signal its home NAI in the NAI-list.

FIG. 1 shows an operating environment 100 consistent with embodiments of the disclosure for providing profile prioritization in a roaming consortium environment. As shown in FIG. 1, operating environment 100 may comprise a client device 102, a plurality of network devices (e.g., a first access point 104 and a second access point 106), a controller 108, and a network 110. First access point 104, second access point 106, and controller 108 may provide a WLAN. Through this WLAN, client device 102 may be provided with access to network 110. Network 110 may comprise a network operated by an institution or enterprise that a user of client device 102 may be associated with. Access to network 110 may also provide client device 102 with access to the Internet or other cloud-based networking environments.

Controller 108 may access and control the plurality of network devices (e.g., first access point 104 and second access point 106) in order to provide client devices (e.g., client device 102) wireless roaming (e.g., via Wi-Fi) within operating environment 100 with the WLAN. Client device 102 may comprise, but is not limited to, a cellular base station, a tablet device, a mobile device, a smartphone, a telephone, a remote control device, a set-top box, a digital video recorder, a cable modem, a personal computer, a network computer, a mainframe, a router, or other similar microcomputer-based device capable of accessing and using the WLAN.

The elements of operating environment 100 (e.g., client device 102, first access point 104, second access point 106, and controller 108) may be practiced in hardware and/or in software (including firmware, resident software, microcode, etc.) or in any other circuits or systems. The elements of operating environment 100 may be practiced in electrical circuits comprising discrete electronic elements, packaged or integrated electronic chips containing logic gates, a circuit utilizing a microprocessor, or on a single chip containing electronic elements or microprocessors. Furthermore, the elements of operating environment 100 may also be practiced using other technologies capable of performing logical operations such as, for example, AND, OR, and NOT, including but not limited to, mechanical, optical, fluidic, and quantum technologies. As described in greater detail below with respect to FIG. 4, the elements of an operating environment may be practiced in a computing device 500.

Figure 2:
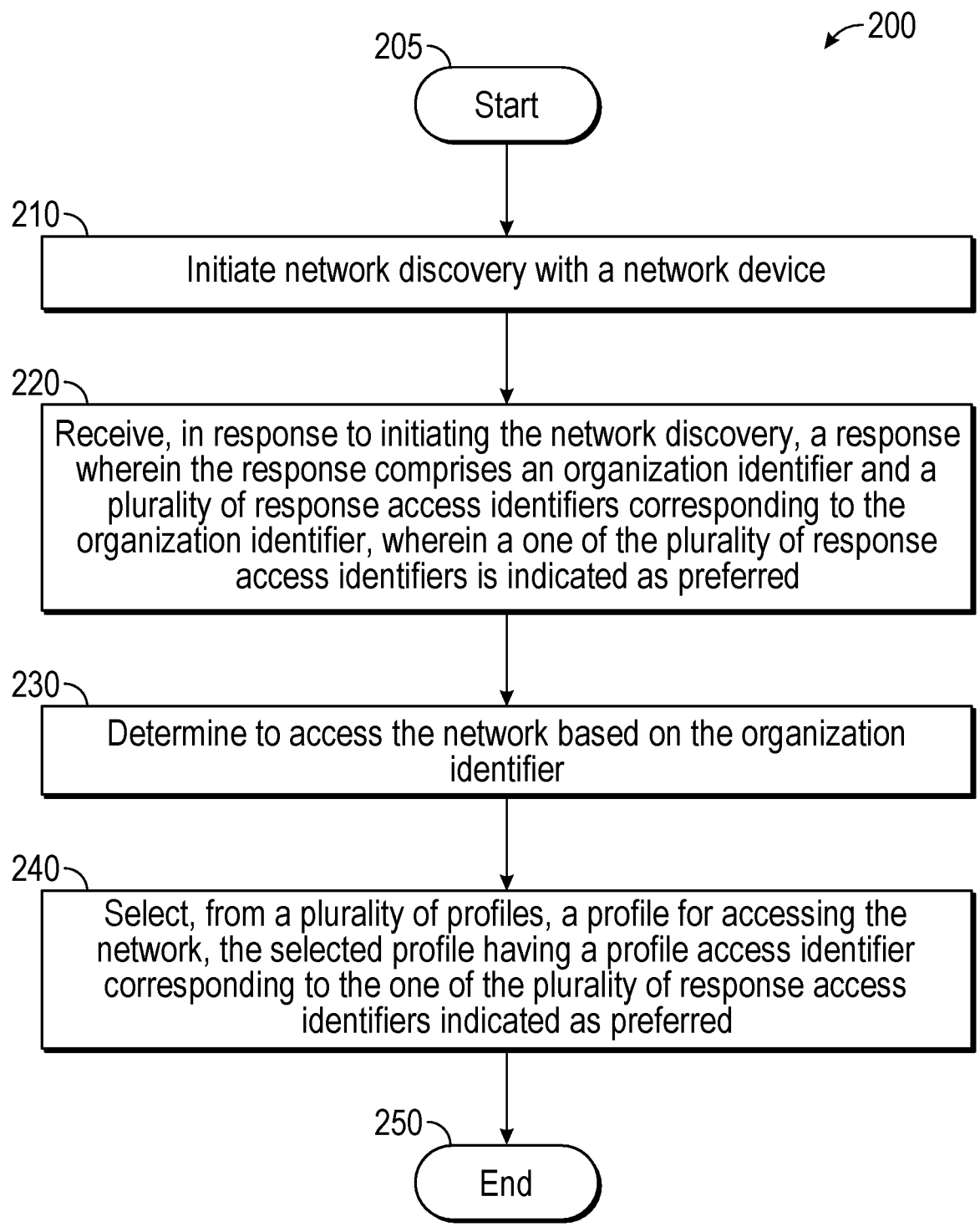
FIG. 2 is a flow chart of a method for providing profile prioritization in a roaming consortium environment.

FIG. 2 is a flow chart setting forth the general stages involved in a method 200 consistent with an embodiment of the disclosure for providing profile prioritization in a roaming consortium environment. Method 200 may be implemented using client device 102 as described in more detail above with respect to FIG. 1. Ways to implement the stages of method 200 may be described in greater detail below.

Method 200 may begin at starting block 205 and proceed to stage 210 where client device 102 may initiate network discovery with a network device (i.e., first access point 104). For example, client device 102 may be roaming from a first environment to operating environment 100. Client device 102 may be associated with a given roaming consortium. Client device 102 may initiate network discovery with first access point 104 using, for example, beacons or probes.

From stage 210, where client device 102 initiates network discovery with the network device (e.g., first access point 104), method 200 may advance to stage 220 where client device 102 may receive, in response to initiating the network discovery, a response 112 from first access point 104. Response 112 may comprise an organization identifier 114 (e.g., an RCOI) and a plurality of response access identifiers 116 (e.g., NAIs) corresponding to organization identifier 114. A one of the plurality of response access identifiers 118 may be indicated (e.g., labeled) as preferred. The one of the plurality of response access identifiers 118 labeled as preferred may be a realm associated with operating environment 100. For example, response 112 may be sent from first access point 104 to client device 102 in a Hot Spot (HS) 2.0 capability support frame that may include the organization identifier 114 comprising an RCOI. The support frame may also include response access identifiers 116 (e.g., NAIs).

Once client device 102 receives, in response to initiating the network discovery, response 112 in stage 220, method 200 may continue to stage 230 where client device 102 may determine to access network 110 based on organization identifier 114. For example, upon receiving response 112, client device 102 may determine that organization identifier 114 corresponds to a roaming consortium that client device 102 may be associated with. Upon this determination, client device 102 may desire to access network 110.

After client device 102 determines to access network 110 based on organization identifier 114 in stage 230, method 200 may proceed to stage 240 where client device 102 may select, from a plurality of profiles 300 stored on client device 102 (e.g., as shown in FIG. 3), a first profile 305 for accessing network 110. As shown in FIG. 3, plurality of profiles 300 may comprise first profile 305 and a second profile 310. The selected profile (i.e., first profile 305) may have a profile access identifier 315 corresponding to the one of the plurality of response access identifiers 118 indicated as preferred as described above. Second profile 310 may have another profile access identifier 320. For example, once client device 102 has selected network 110 based on RCOI (e.g., organization identifier 114), client device 102 may use the provided NAI list (e.g., response access identifiers 116) to select amongst a plurality of profiles (e.g., plurality of profiles 300) that may match a particular RCOI. In the above example, client device 102 may recover the NAI list and select the profile associated with the visited enterprise rather than the user's home enterprise. Accordingly, this may enable the user to access local services for example. Once client device 102 selects, from the plurality of profiles, the profile for accessing network 110 in stage 240, method 200 may then end at stage 250.

Consistent with embodiments of the disclosure, client device 102 may query operating environment 100 about the extended NAI list. First access point 104 may return the NAI list, labeling one or more as preferred. In other embodiments, client device 102 may query operating environment 100 about the NAI list, providing the list of NAIs matching to profiles configured on client device 102. Operating environment 100 may respond with a subset of NAIs that may be supported locally, labelling one or more NAIs as preferred. Operating environment 100 may also return a single preferred NAI.

In yet other embodiments consistent with the disclosure, client device 102 may select the preferred realm based on the realm attached to the username attributed instead of a NAP listed in the profile on client device 102. In other words, client device 102 may match the NAI realms received (e.g. in response 112) from first access point 104 to the realm that is part of the username in the profile. As shown in FIG. 4, a plurality of profiles 400 may comprise a first profile 405 and a second profile 410. In this example, client device 102 may select first profile 405 because username "visiting1@berkshire.uk" matches NAI realm "berkshire.uk" indicated as preferred in response 112.

The NAI list may not need to be solely built based on localization. Instead, the NAI list may be used to signal a preference that may be based on any access provider specific policy. While the above embodiments may describe a scenario with a plurality of device profiles with a common RCOI, the same preference and prioritization approach may be used when the network signals a plurality of RCOIs and client device 102 has multiple profiles that match the signaled RCOIs.

Embodiments of the disclosure may provide a profile selection in a roaming confederation environment where an RCOI may be used for initial network selection, but when a client device has a plurality of profiles matching a particular RCOI, embodiments of the disclosure may provide NAI preference implementation that may allow for arbitration between different profiles.

Figure 5:
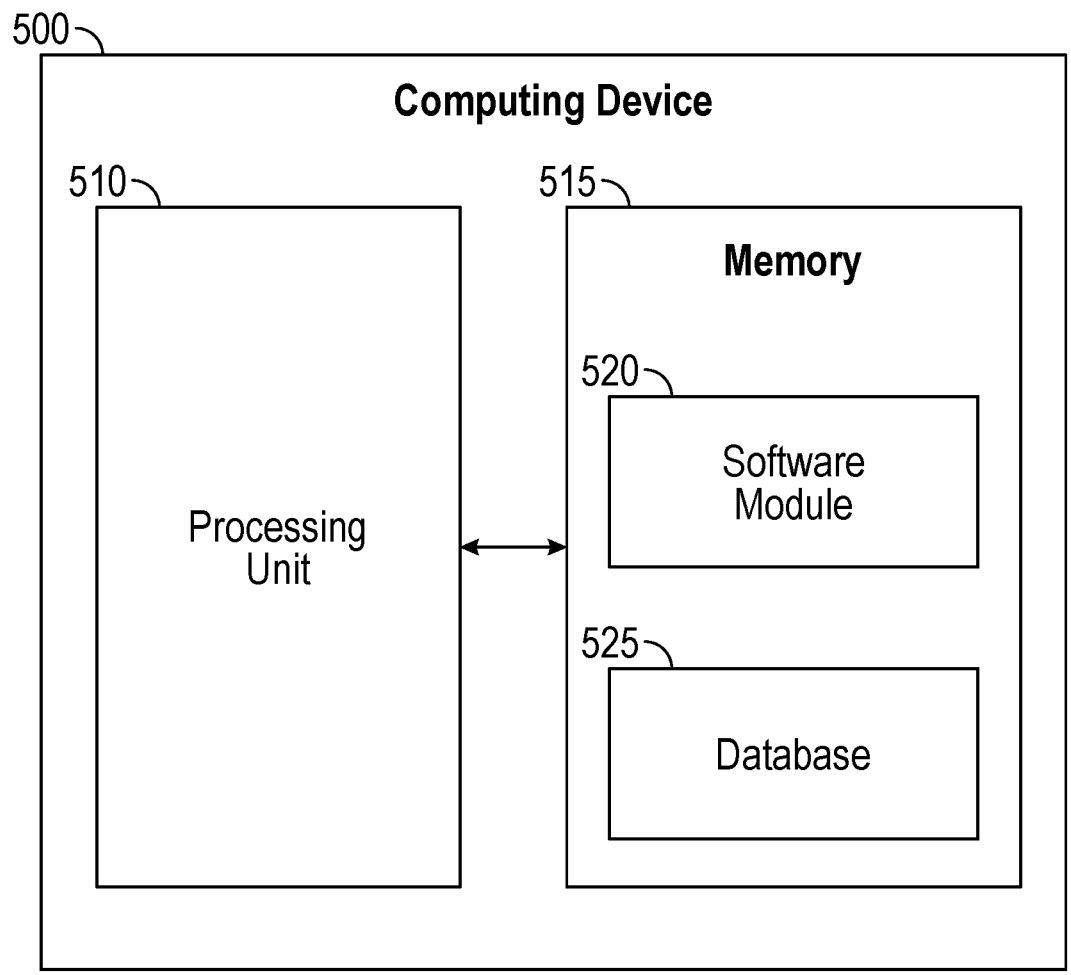
FIG. 5 is a block diagram of a computing device.

FIG. 5 shows computing device 500. As shown in FIG. 5, computing device 500 may include a processing unit 510 and a memory unit 515. Memory unit 515 may include a software module 520 and a database 525. While executing on processing unit 510, software module 520 may perform, for example, processes for providing profile prioritization in a roaming consortium environment, including for example, any one or more of the stages from method 200 described above with respect to FIG. 2. Computing device 500, for example, may provide an operating environment for client device 102, first access point 104, second access point 106, and controller 108. Client device 102, first access point 104, second access point 106, and controller 108 may operate in other environments and are not limited to computing device 500.

Computing device 500 may be implemented using a Wireless Fidelity (Wi-Fi) access point, a cellular base station, a tablet device, a mobile device, a smart phone, a telephone, a remote control device, a set-top box, a digital video recorder, a cable modem, a personal computer, a network computer, a mainframe, a router, a switch, a server cluster, a smart TV-like device, a network storage device, a network relay device, or other similar microcomputer-based device. Computing device 500 may comprise any computer operating environment, such as hand-held devices, multi-processor systems, microprocessor-based or programmable sender electronic devices, minicomputers, mainframe computers, and the like. Computing device 500 may also be practiced in distributed computing environments where tasks are performed by remote processing devices. The aforementioned systems and devices are examples and computing device 500 may comprise other systems or devices.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the disclosure.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to, mechanical, optical, fluidic, and quantum technologies. In addition, embodiments of the disclosure may be practiced within a general purpose computer or in any other circuits or systems.

Embodiments of the disclosure may be practiced via a system-on-a-chip (SOC) where each or many of the element illustrated in FIG. 1 may be integrated onto a single integrated circuit. Such a SOC device may include one or more processing units, graphics units, communications units, system virtualization units and various application functionality all of which may be integrated (or "burned") onto the chip substrate as a single integrated circuit. When operating via a SOC, the functionality described herein with respect to embodiments of the disclosure, may be performed via application-specific logic integrated with other components of computing device 500 on the single integrated circuit (chip).

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

What is claimed is:

1. A method comprising:
    initiating, by a client device, network discovery with a network device;
    receiving, by the client device in response to initiating the network discovery, a response wherein the response comprises an organization identifier and a plurality of response access identifiers corresponding to networks using the organization identifier, wherein a one of the plurality of response access identifiers is indicated as preferred;
    determining, by the client device, to access the network based on the organization identifier; and
    selecting, by the client device from a plurality of profiles, a profile for accessing the network, the selected profile having a profile access identifier corresponding to the one of the plurality of response access identifiers indicated as preferred.

2. The method of claim 1, wherein initiating the network discovery comprises initiating the network discovery using beacons.

3. The method of claim 1, wherein initiating the network discovery comprises initiating the network discovery using Access Network Query Protocol (ANQP).

4. The method of claim 1, wherein receiving the response comprising the organization identifier comprises receiving the response wherein the organization identifier comprises a Roaming Consortium Organization Identifier (RCOI).

5. The method of claim 1, wherein receiving the response comprising the organization identifier and the plurality of response access identifiers comprises receiving the response wherein the plurality of response access identifiers comprise a plurality of Network Access Identifiers (NAIs).

6. The method of claim 1, wherein receiving the response comprises receiving the response in a network support frame.

7. The method of claim 1, wherein selecting the profile for accessing the network comprises selecting the profile for accessing the network wherein the profile access identifier corresponds to a realm portion of a user name listed in the selected profile.

8. The method of claim 1, wherein selecting the profile for accessing the network comprises selecting the profile for accessing the network wherein the profile access identifier corresponds to a Network Access Identifier (NAI) listed in the selected profile.

9. The method of claim 1, further comprising providing, by the network device in response to the client device initiating the network discovery, the response.

10. A system comprising:
    a memory storage; and
    a processing unit coupled to the memory storage, wherein the processing unit is operative to:
        initiate network discovery with a network device;
        receive, in response to initiating the network discovery, a response wherein the response comprises an organization identifier and a plurality of response access identifiers corresponding to networks using the organization identifier, wherein a one of the plurality of response access identifiers is indicated as preferred;
        determine to access the network based on the organization identifier; and
        select, from a plurality of profiles, a profile for accessing the network, the selected profile having a profile access identifier corresponding to the one of the plurality of response access identifiers indicated as preferred.

11. The system of claim 10, wherein the organization identifier comprises a Roaming Consortium Organization Identifier (RCOI).

12. The system of claim 10, wherein the plurality of response access identifiers comprise a plurality of Network Access Identifiers (NAIs).

13. The system of claim 10, the profile access identifier corresponds to a realm portion of a user name listed in the selected profile.

14. The system of claim 10, wherein the profile access identifier corresponds to a Network Access Identifier (NAI) listed in the selected profile.

15. A non-transitory computer-readable medium that stores a set of instructions which when executed perform a method comprising:
    initiating, by a client device, network discovery with a network device;
    receiving, by the client device in response to initiating the network discovery, a response wherein the response comprises an organization identifier and a plurality of response access identifiers corresponding to networks using the organization identifier, wherein a one of the plurality of response access identifiers is indicated as preferred;
    determining, by the client device, to access the network based on the organization identifier; and
    selecting, by the client device from a plurality of profiles, a profile for accessing the network, the selected profile having a profile access identifier corresponding to the one of the plurality of response access identifiers indicated as preferred.

16. The non-transitory computer-readable medium of claim 15, wherein receiving the response comprising the organization identifier comprises receiving the response wherein the organization identifier comprises a Roaming Consortium Organization Identifier (RCOI).

17. The non-transitory computer-readable medium of claim 15, wherein receiving the response comprising the organization identifier and the plurality of response access identifiers comprises receiving the response wherein the plurality of response access identifiers comprise a plurality of Network Access Identifiers (NAIs).

18. The non-transitory computer-readable medium of claim 15, wherein receiving the response comprises receiving the response in a network support frame.

19. The non-transitory computer-readable medium of claim 15, wherein selecting the profile for accessing the network comprises selecting the profile for accessing the network wherein the profile access identifier corresponds to a realm portion of a user name listed in the selected profile.

20. The non-transitory computer-readable medium of claim 15, wherein selecting the profile for accessing the network comprises selecting the profile for accessing the network wherein the profile access identifier corresponds to a Network Access Identifier (NAI) listed in the selected profile.

* * * * *